No. 698,115. Patented Apr. 22, 1902.
C. HIRD.
MOLD FOR THE MANUFACTURE OF CELLULAR CUSHION TIRES FOR WHEELS OF BICYCLES OR OTHER VEHICLES.
(Application filed Sept. 11, 1901.)
(No Model.) 2 Sheets—Sheet 1.
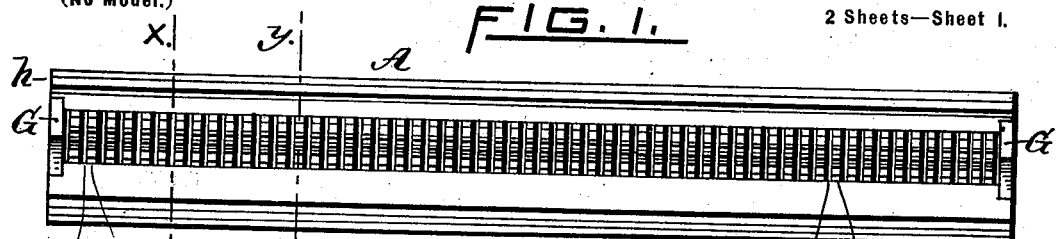
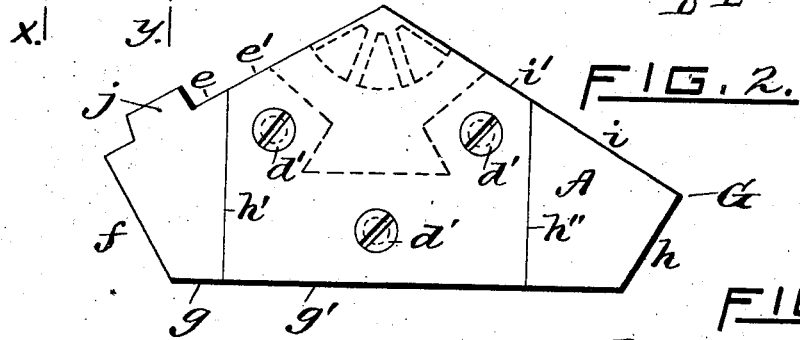
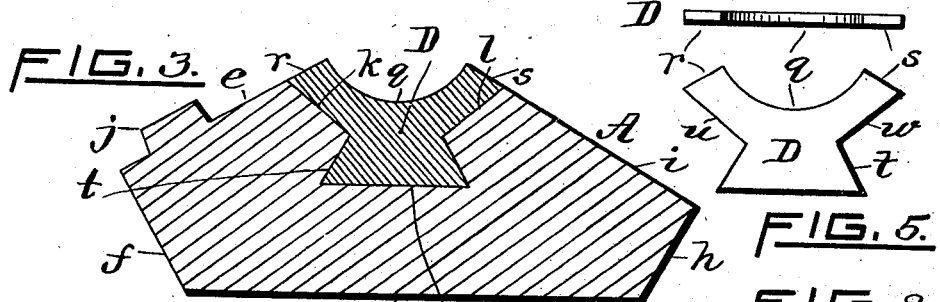
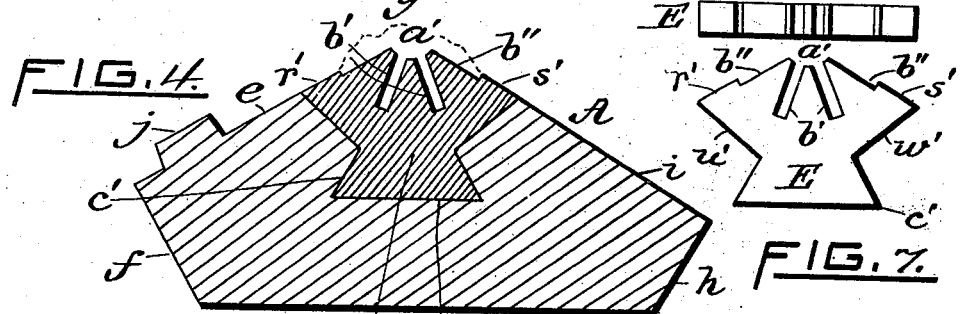
WITNESSES.
Charles T. Hannigan
Annie E. Perce
INVENTOR.
Charles Hird
By Warren R. Perce
Atty.

No. 698,115. Patented Apr. 22, 1902.
C. HIRD.
MOLD FOR THE MANUFACTURE OF CELLULAR CUSHION TIRES FOR WHEELS OF BICYCLES OR OTHER VEHICLES.
(Application filed Sept. 11, 1901.)
(No Model.) 2 Sheets—Sheet 2.

WITNESSES.
Charles T. Hannigan.
Annie E. Perce.

INVENTOR.
Charles Hird
By Warren R. Perce
Atty.

UNITED STATES PATENT OFFICE.

CHARLES HIRD, OF WOONSOCKET, RHODE ISLAND.

MOLD FOR THE MANUFACTURE OF CELLULAR CUSHION-TIRES FOR WHEELS OF BICYCLES OR OTHER VEHICLES.

SPECIFICATION forming part of Letters Patent No. 698,115, dated April 22, 1902.

Application filed September 11, 1901. Serial No. 75,080. (No model.)

*To all whom it may concern:*

Be it known that I, CHARLES HIRD, a subject of the King of England, residing at Woonsocket, in the county of Providence and State of Rhode Island, have invented certain new and useful Improvements in Molds for the Manufacture of Cellular Cushion-Tires for the Wheels of Bicycles or other Vehicles, of which the following is a specification, reference being had therein to the accompanying drawings.

Like letters indicate like parts.

Figure 9:
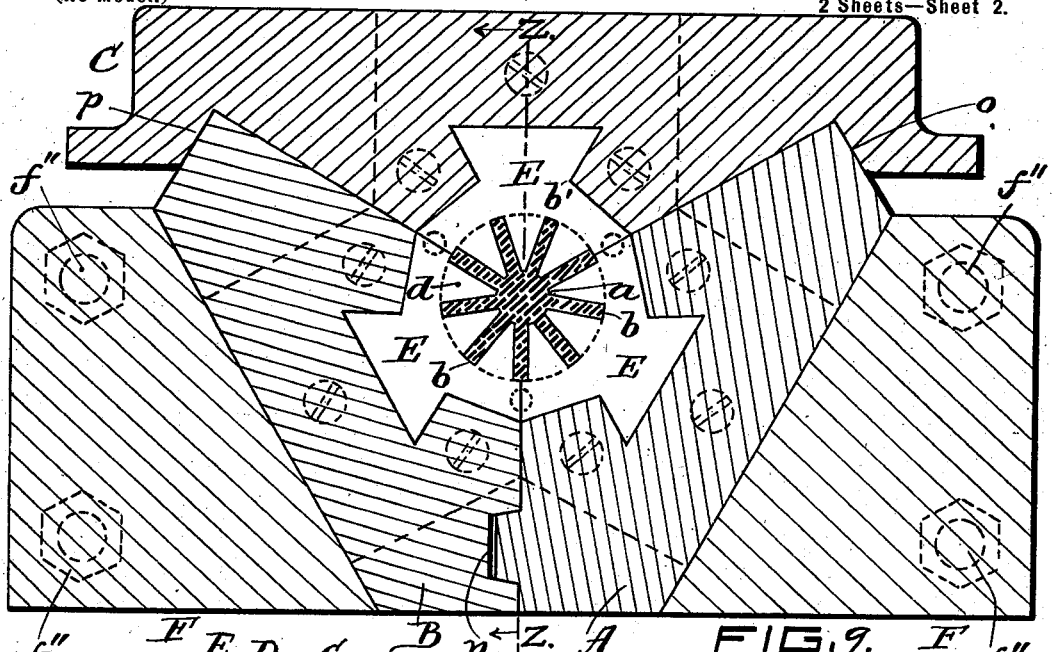
Figure 10:
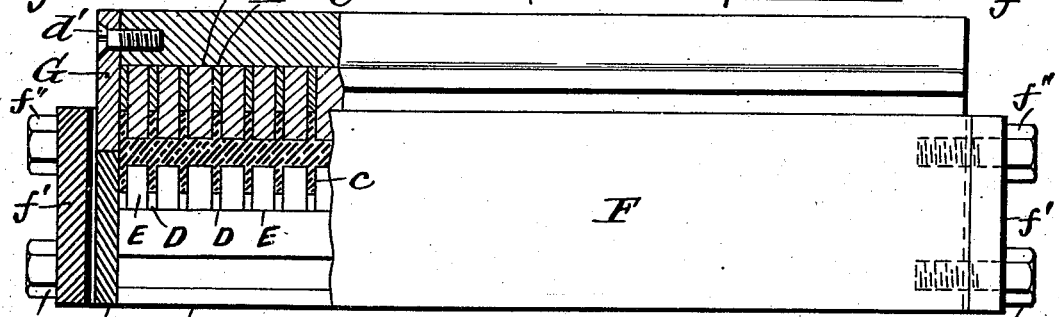
Figure 11:
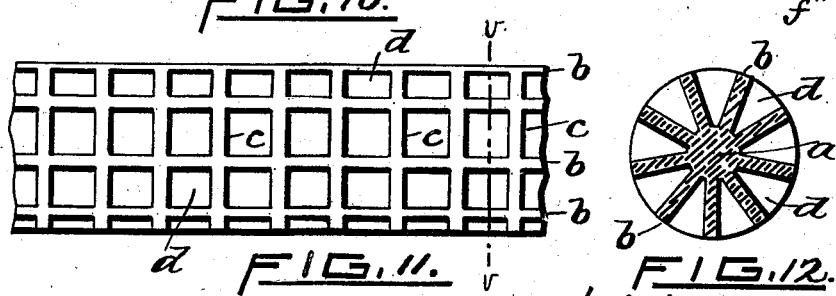
Figure 12:
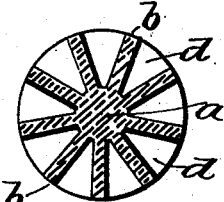

Figure 1 is a top plan view, on a reduced scale, of one of the composite longitudinal sections of my improved mold. Fig. 2 is an end elevation of the same. Fig. 3 is a transverse sectional view as seen on line $x\ x$ of Fig. 1. Fig. 4 is a transverse sectional view as seen on line $y\ y$ of Fig. 1. Fig. 5 is a front elevation of one form of the matrix-pieces used in said mold. Fig. 6 is a top plan view of the same. Fig. 7 is a front elevation of another form of the matrix-pieces used in said mold. Fig. 8 is a top plan view of the same. Fig. 9 is a transverse section of the complete composite mold, including all the longitudinal sections thereof, their holding-pieces, and the frame for holding the longitudinal sections. In this figure the matrix-pieces illustrated in Fig. 7 are shown in front elevation and the rubber tire formed in the mold is shown in cross-section. Fig. 10 is a view, partly in side elevation and partly in transverse section, on line $z\ z$ of Fig. 9 of said frame and means of securing the same in position, the upper and one of the lower composite longitudinal sections of the mold in place within said frame, the locking-plates to hold the respective series of matrix-pieces in operative relation, and the rubber tire contained in the mold. This figure is drawn on a reduced scale. Fig. 11 is a side elevation of the cellular cushion-tire made in my improved mold. Fig. 12 is a transverse section of the same as seen on line $v\ v$ of Fig. 11.

The cellular cushion-tire which is made by my improved mold consists of an internal portion, hereinafter called the "core," (illustrated in Figs. 11 and 12,) and a tubular case or covering, (not shown,) which fits closely over said core and constitutes the exterior portion of the tire. The core is an integral combination of a central longitudinal cylindrical hub or body $a$, a series of parallel, equidistant, longitudinal, and radial walls or partitions $b$, whose inner portions converge to the hub $a$ and whose outer edges when viewed transversely lie in a true circle concentric with the hub $a$ at every cross-section, and a series of parallel equidistant transverse walls or partitions $c$, all as shown in Figs. 11 and 12. It is thus seen that between the contiguous longitudinal walls $b$ and the contiguous transverse walls $c$ there are formed several series of equal symmetrical air cells or spaces $d$, V-shaped, as shown in Fig. 12, and square at the outer apertures thereof, as illustrated in Fig. 11. When the core thus formed is inclosed in a suitable tubular case or covering, a rubber-tire is produced which combines the useful qualities of the pneumatic and solid tires and which is not injured by puncture. Cellular tires of this construction have heretofore been made by the use of a mold whose longitudinal sections are each solid from end to end, the air-cells of the tire being formed by several series or rows of integral wedge-shaped projections extending radially from the bottom and sides of the matrix of said mold. This method of construction has proved to be unsatisfactory and impracticable.

The purpose of my invention is to provide a sectional mold by which the internal portion or core of such cellular cushion-tires may be easily and accurately made.

My invention consists of the novel construction and combination of the several parts or elements, as hereinafter particularly described, and specifically set forth in the claims.

In the drawings, A represents one of three holding-blocks of a suitable length and substantially polygonal sides $e, f, g, h$, and $i$, angularly disposed in relation to each other, as illustrated in Figs. 2, 3, 4, and 9, the sides $e$ and $i$ not, however, being equal in breadth, nor the sides $f$ and $h$. The side $e$ has the longitudinal integral key or tongue $j$ projecting therefrom. The block A has the two inwardly-inclined faces $k$ and $l$, Fig. 3, which extend to a longitudinal mortise $m$, dovetailed in shape, as seen in Figs. 3, 4, and 9. B is another of the three holding-blocks, exactly like the block A, except that instead of having the longitudinal key $j$ it has a longitudinal keyway $n$, in which the key $j$ fits. (See Fig. 9.) C is the third of said holding-blocks, having sides like $e$, $i$, $k$, and $l$ and the mortise $m$ of the blocks A or B, (without, however, either the key $j$ or the keyway $n$,) but having in addition the two inwardly-inclined faces $o$ and $p$. (See Fig. 9.) These three holding-blocks A, B, and C are assembled in the manner plainly shown in Fig. 9.

D is one of several detachable matrix-pieces fitting and movable in the holding-block A. It has an arc-shaped concave seat $q$, two angularly-directed edges $r$ and $s$, and a dovetailed tenon $t$. The tenon $t$ fits in the mortise $m$ of the block A. It also has the two angularly-directed edges $u$ and $w$. When the piece D is in position in the block A, its edges $r$ and $s$, respectively, are continuous with the surfaces $e$ and $i$ of the block A, and its edges $u$ and $w$, respectively, are continuous with the surfaces $k$ and $l$ of the block A, as indicated in Fig. 3.

E is one of several detachable matrix-pieces fitting and movable in the holding-block A. It has an arc-shaped concave seat $a'$, two rectangular slots $b'$, extending radially from the concave seat $a'$, two half-slots $b''$ on the upper edge, two angularly-directed edges $r'$ and $s'$ and two angularly-directed edges $u'$ and $w'$, and a dovetailed tenon $c'$, which latter fits in the mortise $m$ of the block A. When the piece E is in position in the block A, its edges $r'$ and $s'$, respectively, are continuous with the surfaces $e$ and $i$ of the block A and its edges $u'$ and $w'$, respectively, are continuous with the surfaces $k$ and $l$ of the block A, as indicated in Fig. 4. The ends of the block C project considerably in a lateral direction beyond the blocks A, as seen in Fig. 9. Similar individual detachable matrix-pieces D and E are inserted in the holding-blocks B and C, respectively, and are movable therein.

The holding-blocks A and B are held in a frame or block F, having inwardly-sloping surfaces, with which the bases, respectively, of the holding-blocks A and B are in contact, as seen in Fig. 9.

As indicated in Fig. 10, the matrix-pieces D and E are in contact with each other *seriatim* and are arranged in alternation, and the pieces E are thicker than the pieces D. When the matrix-pieces D and E have been so inserted in the holding-block A, as seen in Fig. 1, holding-plates G are placed at the ends of said block to close the ends of the mortise and to press against the matrix-pieces D and E and confine them in position. The shape of these plates is best shown in Fig. 2, where it is seen that the bottom edge $g'$ is in line with the bottom $g$ of the block A. The two side edges $h'$ $h''$ are at right angles with the bottom edge $g'$, and the two upper edges $e'$ and $i'$ are continuous, respectively, with the surfaces $e$ and $i$ of said block A. The plates G are fastened to the block A by the screw $d'$. In like manner a holding-plate H, Fig. 10, is provided at each end of the holding-block B to confine in position therein the matrix-pieces D and E which belong to the block B, and a holding-plate (not shown) similarly confines in position the matrix-pieces D and E which belong to the block C.

The two parts of the frame F are fastened together by the end plates $f'$ $f'$, which are secured thereto by the screws $f''$.

The holding-blocks A, B, and C and the frame-pieces F are made of steel, cast-iron, or other suitable material. The matrix-pieces D and E are preferably punched or otherwise formed from sheet-steel.

It is seen by the foregoing description that the mold is built up of detachable pieces D and E, which by reason of their dovetailed tenons are movable along the dovetailed mortise of the holding-block to which they belong, and when inserted and arranged in alternation therein, as shown, they are clamped in position by means of holding-plates, which are screwed upon the ends of the holding-block wherein they are mounted. When the three sections A, B, and C are in this manner built up and ready for use, I press the rubber, which is in a suitably plastic condition, into the matrix formed by said pieces D and E and completely fill the spaces so provided. It is desirable to heap up or round out the material, as indicated by the curved dotted line in Fig. 4. The three mold-sections A, B, and C thus filled are placed in position in the frame, as shown in Fig. 9, and the whole is then put in a steam-press and subjected to heat. The rubber is thus softened still more, and as the parts of the mold are pressed together the rubber flows into all the spaces of the matrix. The half-slots $b''$ $b''$ of the pieces E coming into contiguity with the corresponding half-slots of the adjacent pieces E made such contiguous half-slots whole slots, like those indicated, as $b'$, in Fig. 7. The concaved seats $q$ of the three pieces D when said pieces are matched form a true circle and give the circular form to the periphery of the transverse walls or partitions $c$. In the molding operation every two pieces D form between them one of the transverse walls or partitions $c$ of the core of the tire, while every longitudinal row of slots $b'$ in all the assembled pieces E form one of the longitudinal walls or partitions $b$ of the said core. The wedge-shaped tooth, which extends between the adjacent slots $b'$ of each piece E, occupies in the process the space which in the finished product is the air-cell $d$.

The mold-sections when put in the steam-press do not at first shut closely together, owing to the excess of material, (indicated by the curved dotted line in Fig. 4;) but as the rubber melts down under the action of heat it flows into all the spaces of the matrix as the pressure is applied. When this has been done and the rubber cured, the mold is with-drawn from the steam-press, and the composite mold-sections A, B, and C are then detached from the rubber core therein. If desired, there may be a slight concaved recess across the edges $r$ and $s$ of the matrix-pieces D and $r'$ and $s'$ of the matrix-pieces E, which recesses coming into contiguity with those of the adjacent pieces when all the parts of the mold are assembled form the longitudinally-running apertures (shown by dotted lines in Fig. 9) to receive and take up any excess of material that may be jammed out between said edges during the formation of the core.

The essential feature of my improved mold is the combination of separate individual matrix-pieces, which when placed in a proper support and arranged in contact with each other *seriatim* together constitute the matrix, which gives form to the rubber core of the cellular cushion-tire. These pieces are inserted one by one at one end of the dovetailed mortise of the block and then moved into position and contact one after another, the dovetail tenon of each piece confining said piece to a true linear travel, although permitting proper movement longitudinally in the mortised block which supports them; but although this is my preferred method of placing and supporting the movable matrix-pieces I do not wish to be limited to this exact device, but broadly claim any and all means of attaching, supporting, and holding in position the movable matrix-pieces to and in the mold-block for the purpose of forming a matrix.

The mold-sections may be in any desired length, and the operation is repeated until the requisite length of tire has been made, whereupon the rubber core so formed is incased in a proper tube of rubber or suitable material, and the two ends of the tires are butted and cemented together.

I claim as a novel and useful invention and desire to secure by Letters Patent—

1. The improved mold for the manufacture of cellular cushion-tires, consisting of a plurality of longitudinal blocks, a set comprising a plurality of matrix-pieces mounted movably on and supported by each of said blocks, means for holding the matrix-pieces to their companion block, and means for holding said blocks together, substantially as described.

2. The improved mold for the manufacture of cellular cushion-tires, consisting of a plurality of grooved longitudinal blocks, a set comprising a plurality of matrix-pieces mounted on each of said blocks and movable in the groove thereof, means for holding the matrix-pieces adjustably to their companion block, and means for holding said blocks together, substantially as specified.

3. The improved mold for the manufacture of cellular cushion-tires, consisting of a plurality of supporting-blocks each of which has a longitudinal dovetailed mortise, a set comprising a plurality of matrix-pieces each of which has a dovetailed tenon engageable and movable in said mortise, means for holding the matrix-pieces in adjusted position in the mortise of their companion blocks, respectively, and means of holding said supporting-blocks together, substantially as described.

4. The improved mold for the manufacture of cellular cushion-tires, consisting of a plurality of supporting-blocks each of which has a longitudinal dovetailed mortise, a set comprising a plurality of matrix-pieces each of which has a dovetailed tenon engageable and movable in said mortise, a holding-plate on the ends of each supporting-block secured thereto, and means for holding said supporting-block together, substantially as shown.

5. The improved mold for the manufacture of cellular cushion-tires, consisting of three supporting-blocks each of which has a central, longitudinally-extending, dovetailed mortise, one of which blocks has a longitudinal projecting key and another of which blocks has a longitudinal groove with which said key is engageable and the third of which blocks fits over and embraces the tops of said first and second blocks, a set for each of said blocks comprising a plurality of matrix-pieces each of which has a dovetailed tenon engageable with the mortise of the companion block and a plate closing each end of each of said mortises, substantially as set forth.

6. The improved mold for the manufacture of cellular cushion-tires, consisting of three supporting-blocks each of which has a central longitudinally-extending, dovetailed mortise, one of which blocks has a longitudinal projecting key, the second of which blocks has a longitudinal groove with which said key is engageable and the third of which blocks fits over and embraces the tops of said first and second blocks, a set for each of said blocks comprising a plurality of matrix-pieces each of which has a dovetailed tenon engageable with the mortise of the companion block, a plate closing each end of each of said mortises, and a frame adapted to receive and hold the first and second of said supporting-blocks, together with means for clamping said frame to the two blocks last aforesaid, substantially as described.

7. In a mold for the manufacture of cellular cushion-tires, the combination of a mold-section having a longitudinal groove, a plurality of matrix-pieces adjustably mounted and held in said longitudinal groove and each having an upper concave seat formed in the arc of a circle of a certain radius, and a plurality of other matrix-pieces adjustably mounted and held in said longitudinal groove and each having an upper concave seat formed in an arc of a circle of a radius less than that of the arc first mentioned and also having radial slots extending from the last-named concave seat, said matrix-pieces respectively of this first sort alternating with and in contact with said matrix-pieces, respectively, of the second sort, substantially as and for the purpose specified.

8. In a mold for the manufacture of cellular cushion-tires, the combination of three mold-sections, each having a longitudinal groove, a set for each of said mold-sections comprising a plurality of matrix-pieces adjustably mounted and held in said longitudinal groove and each having a concave seat formed in the arc of a circle one hundred and twenty degrees in extent and of a certain radius, and a set for each of said mold-sections comprising a plurality of matrix-pieces adjustably mounted and held in said longitudinal groove and each having a concave seat formed in the arc of a circle one hundred and twenty degrees in extent and having a radius less than that of the arc first mentioned and also having radial slots extending from the last-named concave seat, said matrix-pieces of the first sort alternating with and in contact with said matrix-pieces, respectively, of the second sort, and means for holding said mold-sections in operative contact, substantially as specified.

9. In a mold for the manufacture of cellular cushion-tires, a matrix composed of detachable and adjustable plates extending in juxtaposition *seriatim* in planes at right angles to the axial plane of the mold, the inner edges of said plates and the surfaces of said plates contiguous to said edges constituting the molding-surface of the matrix, substantially as described.

10. In a mold for the manufacture of cellular cushion-tires, a matrix composed of two sets of detachable and adjustable plates extending in planes at right angles with the axial plane of the mold, one set of said plates having when assembled a central circular aperture of a certain diameter and the other set of said plates having when assembled a central circular aperture of a less diameter from which extend radial slots, said sets being arranged with one of the plates of the first sort in alternation with and in contact with one of the plates of the second sort in a series the entire length of the mold, substantially as specified.

11. The improved mold for the manufacture of cellular cushion-tires herein described, consisting of the combination of the supporting-blocks A, B and C each having angular faces as shown and fitting together on their contiguous faces, each of which blocks has an inwardly-flaring longitudinal groove opening into a dovetailed mortise, a spline connection between the blocks A and B, the frame F having the screw-clamping ends *f* and adapted to fasten the blocks A and B together, a set of matrix-pieces D for each of the blocks A, B and C and each having a dovetailed tenon, engageable with the mortise of its companion block and each having a concave seat in an arc comprising one-third of a circle of a certain diameter, a set of matrix-pieces E for each of the blocks A, B and C and each having a dovetailed tenon engageable with the mortise of its companion block and each having a concave seat in an arc comprising one-third of a circle of a less diameter than the first-named circle, said matrix-pieces D, respectively, being in contact with said matrix-pieces E, respectively, *seriatim*, and holding-plates closing the ends of said mortises, respectively, all arranged substantially as shown and for the purpose specified.

In testimony whereof I affix my signature in presence of two witnesses.

CHARLES HIRD.

Witnesses:
 EDWARD F. LOVEJOY,
 HOWARD A. LAMPREY.